United States Patent [19]

Kotani et al.

[11] Patent Number: 5,545,243
[45] Date of Patent: Aug. 13, 1996

[54] POROUS CERAMIC HONEYCOMB FILTER

[75] Inventors: Wataru Kotani, Kasugai; Yoshiro Ono; Kazuhiko Kumazawa, both of Nagoya, all of Japan

[73] Assignee: NGK Insulators, Ltd., Japan

[21] Appl. No.: 354,414

[22] Filed: Dec. 12, 1994

[30] Foreign Application Priority Data

Dec. 15, 1993 [JP] Japan .................................. 5-315199

[51] Int. Cl.$^6$ .......................... B01D 39/20; C04B 38/00
[52] U.S. Cl. .................. 55/523; 55/DIG. 30; 428/116; 428/188
[58] Field of Search ................ 55/523, DIG. 30; 210/510.1; 60/311; 428/116, 118, 188

[56] References Cited

U.S. PATENT DOCUMENTS

| | | | |
|---|---|---|---|
| 4,464,185 | 8/1984 | Tomita et al. | 55/523 |
| 4,869,944 | 9/1989 | Harada et al. | 55/523 |
| 4,912,076 | 3/1990 | Mizrah et al. | 55/523 |
| 4,946,487 | 8/1990 | Butkus | 55/523 |
| 5,069,697 | 12/1991 | Hamaguchi et al. | 55/523 |

FOREIGN PATENT DOCUMENTS

| | | |
|---|---|---|
| 0092840 | 11/1983 | European Pat. Off. . |
| 0450899 | 10/1991 | European Pat. Off. . |
| 0545008 | 5/1993 | European Pat. Off. . |
| 3541372 | 6/1986 | Germany . |
| 3816893 | 5/1989 | Germany . |
| 58-70814 | 4/1983 | Japan . |
| 58-133810 | 8/1983 | Japan ............................ 55/523 |
| 61-129015 | 6/1986 | Japan . |
| 63-31517 | 2/1988 | Japan ............................ 55/523 |
| 63-240912 | 10/1988 | Japan ............................ 55/523 |
| 3-284313 | 12/1991 | Japan . |

Primary Examiner—Jay H. Woo
Assistant Examiner—Duane S. Smith
Attorney, Agent, or Firm—Parkhrst, Wendel & Burr

[57] ABSTRACT

A porous ceramic filter has properties such that a porosity of the filter is more than 45% and less than 60%, a volume of pores having a pore size of less than 40 μm is more than 60% of total volume of pores of the ceramic filter and an inequality of 1000M+85N≧530 is satisfied, wherein M (m$^2$/g) is a specific surface of total pores continued from a surface to an inner portion of the filter and N (μm) is a surface roughness of a surface of the filter. Preferably, the porous ceramic filter has a thermal expansion coefficient of less than 0.5×10$^{-6}$/°C. within a temperature range of 40°–800° C. in a direction parallel to a flow passage of the filter. The porous ceramic filter according to the invention is preferably used for eliminating soots in an exhaust gas from a diesel engine, and has a long operating time and requires less frequent filter regenerations.

6 Claims, 3 Drawing Sheets

FIG. 1

| | Talc particle | Silica particle | State of raw material distribution in extruded forming body talc (○), silica (△) | Pore specific surface (M) | Surface roughness (N) |
|---|---|---|---|---|---|
| Case 1 | fine | fine | | ○ | × |
| Case 2 | fine | coarse | | ○ | ○ |
| Case 3 | Coarse | fine | | × | × |
| Case 4 | coarse | coarse | | × | ○ |

POROUS CERAMIC HONEYCOMB FILTER

FIELD OF THE INVENTION

The present invention relates to a porous ceramic honeycomb filter suitable for removing soot included in an exhaust gas from a diesel engine.

RELATED ART STATEMENT

Porous ceramic honeycomb filters made of cordierite have an excellent heat resistivity as compared with other materials, and thus they are effective for a filter used at high temperatures. For example, porous ceramic honeycomb filters are used as a filter for collecting soot included in an exhaust gas, which is assembled in a diesel engine.

As important properties of the porous ceramic honeycomb filters, there are three factors such as soot trapping efficiency, operating time and pressure loss. Among these three factors, it is preferred to make the operating time longer, since the operating time means a time during which soot collection can be performed under a predetermined pressure loss. If the operating time is made longer, the number of filter regenerations is decreased, and thus a filter deterioration can be eliminated. The operating time can be easily made longer, if a large number of holes are formed in wall portions which construct a filter. However, it is not preferred to form a large number of holes in the wall portions, since the trapping efficiency is decreased.

In order to improve filteration properties, Japanese Patent Laid-Open Publication No. 61-129015 (JP-A-61-129015) discloses a method of controlling a ratio of an amount of small pores having a pore size of 5~40 μm and an amount of large pores having a pore size of 40~100 μm, both pores being open in a filter surface. However, in this method, as it is necessary to add poring agents so as to control pores in the filter surface, total cost increases. Moreover, since there is no means for eliminating an increase of pressure loss, a load on the engine increases.

Japanese Patent Laid-Open Publication No. 3-284313 (JP-A-3-284313) discloses a method of improving a trapping efficiency by performing pore control by controlling grain size distributions of talc and silica in raw materials for cordierite generation such that the amount of particles having a particle size of more than 150 μm is less than 3 wt. % with respect to the total weight of 100 wt. % and also the amount of particles having a particle size of less than 45 μm is less than 25 wt. %. In this method, in order to improve the trapping efficiency, not only talc and silica but also kaolin and alumina are used as coarse raw materials. Under the condition such that coarse kaolin and alumina are used, it is possible to improve the trapping efficiency by controlling grain size distributions of talc and silica. However, since use is made of coarse kaolin and alumina, a reactivity becomes worse in the case of cordierite generation during firing, and thus a thermal expansion coefficient of the fired honeycomb structural body becomes high.

Further, Japanese Patent Laid-Open Publication No. 58-70814 (JP-A-58-70814) discloses a method of improving an operating time by eliminating pressure loss by means of through holes formed in a partition wall of the filter. However, in this method, while the operating time is certainly made longer, the trapping efficiency is extraordinarily lowered.

As mentioned above, in the conventional porous honeycomb filter, if the trapping efficiency is made higher, the pressure loss due to soot collection is increased rapidly and accordingly. That is to say, the operating time, during which the filter can be used while pressure loss is maintained in a level of real use, is shortened. Therefore, if such a filter is assembled in an exhaust system of a diesel engine, it is not sufficient to perform filter regenerations once per day. Moreover, since the number of filter regenerations is increased, a filter deterioration or breakage occurs partly in the filter and thus filter properties are extraordinarily lowered.

SUMMARY OF THE INVENTION

An object of the present invention is to eliminate the drawbacks mentioned above and to provide a porous ceramic honeycomb filter having a long operating time and requiring less frequent filter regenerations.

Another object of the present invention is to provide a porous ceramic honeycomb filter which improves two properties such as a heat resistivity under high temperatures (depending upon a thermal expansion coefficient) and trapping efficiency.

According to the invention, a porous ceramic honeycomb filter used for separating a solid phase and a gaseous phase from a mixture phase included in a solid phase and a gaseous phase, is characterized in that a porosity of said filter is more than 45% and less than 60%; a volume of pores having a pore size of less than 40 μm is more than 60% of total volume of pores of said ceramic filter; and an inequality of $1000M+85N \geq 530$ is satisfied, wherein M (m²/g) is a specific surface of total pores continued from a surface to an inner portion of said filter and N (μm) is a surface roughness of a surface of said filter.

BRIEF DESCRIPTION OF THE DRAWINGS

FIG. 1 is a schematic view showing effects of talc and silica grain sizes on a specific surface of pores (M) and a surface roughness (N);

DESCRIPTION OF THE PREFERRED EMBODIMENT

Figure 2:
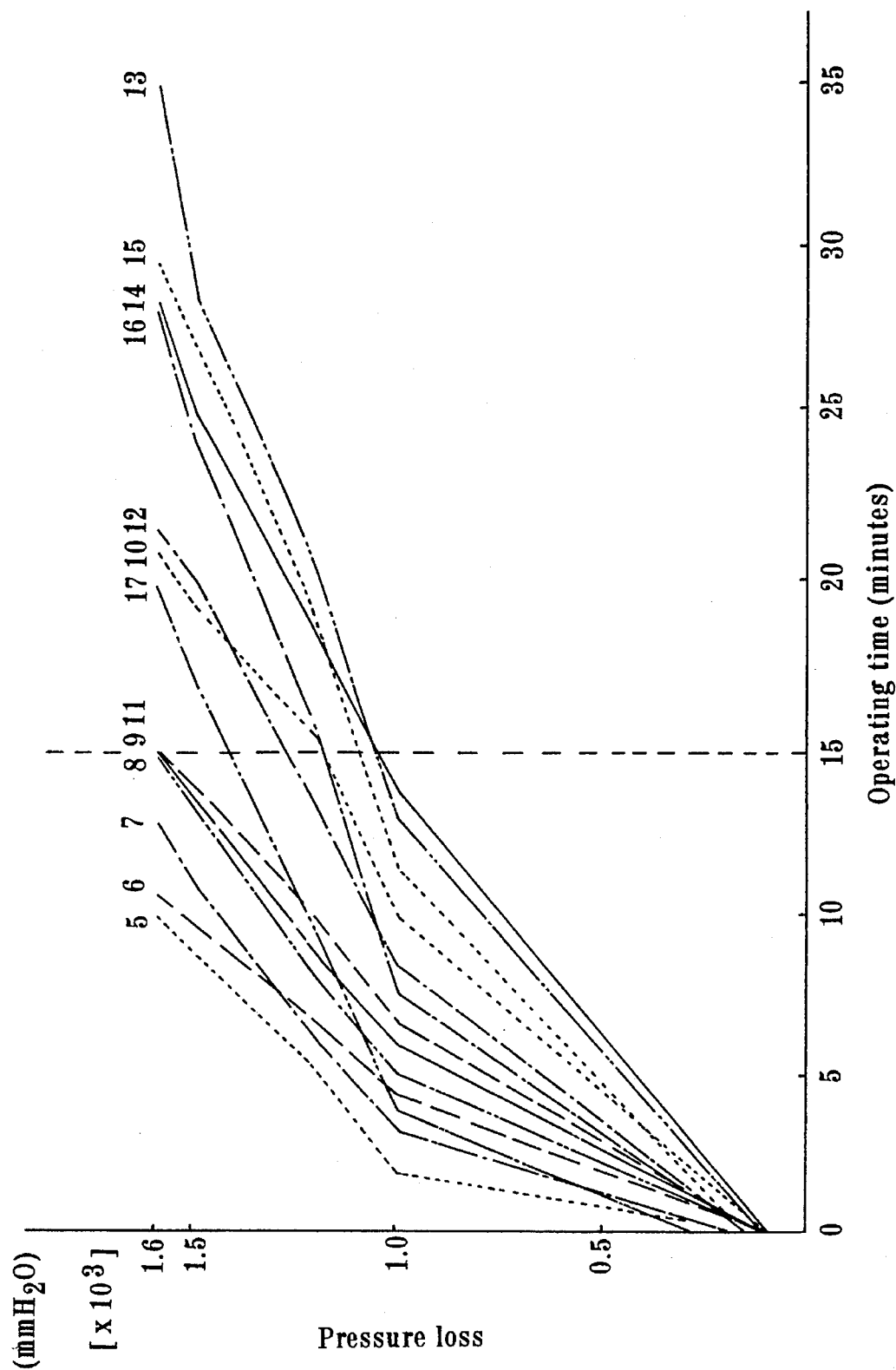
FIG. 2 is a graph illustrating a relation between pressure loss and measuring time.

As a filter for automobiles, it is necessary to elongate an operating time as compared with that of a conventional porous ceramic filter, while a trapping efficiency thereof is maintained to more than 90%. To achieve this requirement, we found that it is effective to use a porous ceramic filter which increases an area for collecting soot on a surface of the ceramic filter (hereinafter, called as effective filter area) and also increases the number of pores continued from a surface to an inner portion of the filter for preventing an increase of pressure loss.

That is to say, after various examinations, we found that it is necessary to satisfy an inequality of $1000M+85N \geq 530$, wherein M is a specific surface of total pores continued from a surface to an inner portion of the filter and N is a surface roughness on a surface of the filter, so as to obtain an operating time that is one half as long as that of the conventional filter. An increase of continued pores in the filter can be achieved by increasing a specific surface of the pores existing in a surface and an inner portion of the filter. That is to say, if a specific surface is increased while a volume of pores is maintained as it is, the number of pores is increased. Then, if the number of pores is increased, a contact probability of pores is increased and thus a continuity of pores is improved accordingly. In order to increase a specific surface of pores existing in the filter, it is effective to form a number of pores in the filter by using fine talc raw materials.

Contrary to this, since soot discharged from a diesel engine are collected on a surface of the filter, a trapping area on a surface of the filter is increased if the effective filter area is increased. In order to increase the effective filter area, it is effective to increase a trapping area of the filter by increasing surface roughness of the filter. In order to increase surface roughness rough, it is effective to use coarse silica raw materials.

It is possible to improve filtration properties by increasing a specific surface of pores or a surface roughness independently. However, it is preferred to increase both a specific surface of pores (M) and a surface roughness (N) on a surface of the filter while an inequality of $1000M+85N \geq 530$ is maintained.

As for raw materials for forming pores, talc and silica are preferably used since they contribute largely to formation of pores. It is possible to elongate an operating time while an inequality of $1000M+85N \geq 530$ is satisfied, if use is made of talc raw materials having a mean particle size of less than 40 μm and silica raw materials having a mean particle size of less than 80 μm, and an inequality of (2x mean particle size of silica) $\geq$ (mean particle size of talc) is maintained.

A combination of grain sizes of talc and silica is shown in FIG. 1. In case 1, since both grain sizes of talc and silica are fine, shapes of particles are not affected and thus raw materials are distributed uniformly. Therefore, a large number of pores exist uniformly, and thus, continued pores are increased, thereby increasing a specific surface of pores (M). However, a surface roughness (N) is not increased since particles are fine.

In case 2, since a grain size of talc is fine, shapes of talc particles are not affected and thus talc raw materials are distributed uniformly. Moreover, a grain size of silica is coarse, but shapes of silica particles are spherical. Therefore, shapes of silica particles are not affected since coarse silica particles are gathered in a center portion of a rib of the filter, and thus silica raw materials are distributed uniformly. In this case, it is possible to increase a surface roughness (N) due to coarse silica particles existing on a surface of the filter, and also increase a specific surface of pores (M) due to a large number of small pores generated from fine talc particles, and thus this case 2 is best.

In a case 3, since a grain size of silica is fine, silica raw materials are distributed uniformly. However, since a grain size of talc is coarse and shapes of talc particles are planar, shapes of talc particles are affected and also talc particles are gathered in a center portion of a rib of the filter. Therefore, it is not possible to increase a surface roughness (N), since coarse particles are not existent in a surface of the filter. Moreover, it is not possible to increase a specific surface of pores (M), since large pores are generated in a center portion of the rib of the filter due to fine talc particles, and thus pore continuity decreases.

In case 4, since grain sizes of talc and silica are coarse, talc raw materials are gathered in a center portion of a rib of the filter, and silica raw materials are distributed uniformly. Therefore, a surface roughness (N) is increased due to coarse silica particles existing in a surface of the filter, but a specific surface of pores (M) is decreased due to large pores generated from coarse raw materials, and thus pore continuity decreases.

A porous ceramic honeycomb filter according to the invention is produced in a manner mentioned below. At first, raw materials of talc, kaolin, alumina, silica and raw materials for cordierite generation are mixed to obtain a mixture having a composition of 42~56 weight % of $SiO_2$, 30~45 weight % of $Al_2O_3$ and 12~16 weight % of MgO, whose center composition is near a theoretical composition of cordierite. Then, the mixture is further mixed with 0~50 weight % of poring agents such as graphite, forming agents such as surface activator, like methylcellulose, and solvents such as water and alcohol to obtain a ceramic batch. Then, the ceramic batch is extruded into a honeycomb structural body, and the honeycomb structural body is fired at a temperature at which cordierite reaction proceeds sufficiently. After that, both ends of the ceramic honeycomb structural body are sealed like checker patterns, wherein, if one end of a flow passage is closed, the other end thereof is opened, to obtain a ceramic filter.

Hereinafter, the present invention will be explained in detail with reference to actual examples.

Raw materials for cordierite generation having various grain sizes shown in Table 1 were prepared. Then, the thus prepared raw materials were mixed, extruded, fired and sealed according to the producing method mentioned above to obtain ceramic filters having a rib thickness of 0.45 mm, a diameter of 118 mm and a length of 152 mm.

With respect to the ceramic filters, a porosity was measured by a mercury-porosimeter, and a pore distribution and a specific surface of pores were measured. Moreover, a surface roughness was measured by a contact method. Open pores in a surface were analyzed by an image processing apparatus. As for filtration properties, a trapping efficiency and a pressure loss were measured.

The measured results are shown in Table 1 and Table 2. In Table 1, sample Nos. 1~8 are comparative examples, and sample Nos. 9~17 are examples according to the invention. Properties of sample Nos. 1~17 shown in Table 1 are denoted in Table 2. In Table 2, an operating time means a time to which pressure loss is increased up to $1.6 \times 10^3$ mmH$_2$O. Measured results of pressure loss are also shown in FIG. 2. It should be noted that, since collection efficiencies of sample No. 3 and 4 are too low, they are not plotted in FIG. 2.

TABLE 1

| Sample No. | | Average particle size of talc (μm) | Average particle size of silica (μm) | Average particle size of kaolin (μm) | Average particle size of alumina (μm) | Average particle size of talc/ Average particle size of silica | Additional amount of graphite (%) |
| --- | --- | --- | --- | --- | --- | --- | --- |
| Reference example | 1 | 28 | 15 | 9 | 2 | 1.87 | 20 |
| | 2 | 55 | 30 | 9 | 2 | 1.83 | 20 |
| | 3 | 60.0 | 85.0 | 8.5 | 5.5 | 0.75 | 20 |

TABLE 1-continued

| Sample No. | | Average particle size of talc (μm) | Average particle size of silica (μm) | Average particle size of kaolin (μm) | Average particle size of alumina (μm) | Average particle size of talc/ Average particle size of silica | Additional amount of graphite (%) |
|---|---|---|---|---|---|---|---|
| | 4 | 22.3 | 100.0 | 3.3 | 1.8 | 2.23 | 20 |
| | 5 | 30.0 | not used | 8.5 | 5.5 | — | 20 |
| | 6 | 80.0 | 19.8 | 3.3 | 1.8 | 4.04 | 20 |
| | 7 | 22.3 | 6.0 | 3.3 | 1.8 | 3.72 | 20 |
| | 8 | 11.3 | 5.0 | 3.3 | 1.8 | 2.26 | 25 |
| Present invention | 9 | 40.0 | 20.0 | 3.3 | 1.8 | 2.00 | 30 |
| | 10 | 40.0 | 31.0 | 3.3 | 1.8 | 1.29 | 10 |
| | 11 | 22.3 | 19.8 | 3.3 | 1.8 | 1.13 | 15 |
| | 12 | 22.3 | 19.8 | 3.3 | 1.8 | 1.13 | 20 |
| | 13 | 10.0 | 40.0 | 3.3 | 1.8 | 0.25 | 20 |
| | 14 | 40.0 | 40.0 | 4.5 | 1.8 | 1.00 | 20 |
| | 15 | 10.9 | 19.8 | 3.3 | 1.8 | 0.55 | 25 |
| | 16 | 3.8 | 19.8 | 3.3 | 1.8 | 0.19 | 30 |
| | 17 | 3.8 | 6.0 | 3.3 | 1.8 | 0.63 | 30 |

TABLE 2

| Sample No. | Pore specific surface M (m$^2$/g) | Surface roughness N (μm) | Porosity (%) | Thermal expansion coefficient (× 10$^{-6}$/°C.) | Value of 1000M + 85N | Pore volume ≦40 μm (%) | Pore volume ≧100 μm (%) | Mean pore size (μm) | Surface open pore total number (piece/mm$^2$) | Surface open pore area fraction (%) | Tapping efficiency (%) | Operating time (min.) |
|---|---|---|---|---|---|---|---|---|---|---|---|---|
| Reference example | | | | | | | | | | | | |
| 1 | — | — | 52 | 0.51 | — | — | 3.0 | — | — | — | 98 | 6 |
| 2 | — | — | 60 | 0.58 | — | — | 3.2 | — | — | — | 95 | 25 |
| 3 | 0.06 | 7.1 | 53 | 0.93 | 664 | 54.8 | 11.2 | 42.1 | 700 | 18.3 | 54.0 | >50 |
| 4 | 0.10 | 6.8 | 56 | 0.41 | 678 | 52.1 | 12.4 | 20.0 | 1000 | 16.3 | 61.0 | >50 |
| 5 | 0.07 | 3.8 | 49 | 0.56 | 393 | 89.4 | 3.1 | 14.1 | 2200 | 15.0 | 95.0 | 10.0 |
| 6 | 0.11 | 4.2 | 53 | 0.44 | 467 | 58.9 | 9.0 | 33.8 | 1100 | 16.3 | 90.0 | 10.7 |
| 7 | 0.19 | 3.7 | 51 | 0.28 | 505 | 93.8 | 2.3 | 10.9 | 2100 | 17.1 | 97.3 | 13.0 |
| 8 | 0.26 | 3.1 | 49 | 0.19 | 523 | 91.0 | 2.8 | 19.2 | 3800 | 17.0 | 94.3 | 14.9 |
| Present invention | | | | | | | | | | | | |
| 9 | 0.14 | 4.6 | 54 | 0.29 | 531 | 62.0 | 5.9 | 34.0 | 1000 | 15.8 | 90.3 | 15.0 |
| 10 | 0.15 | 7.4 | 45 | 0.33 | 779 | 73.7 | 5.7 | 24.6 | 900 | 11.1 | 90.5 | 20.9 |
| 11 | 0.10 | 5.1 | 46 | 0.08 | 534 | 89.7 | 3.0 | 15.0 | 1400 | 17.4 | 97.6 | 15.1 |
| 12 | 0.17 | 5.2 | 52 | 0.10 | 612 | 91.1 | 2.9 | 14.8 | 1800 | 16.1 | 99.0 | 21.5 |
| 13 | 0.22 | 6.5 | 55 | 0.23 | 773 | 86.2 | 3.5 | 18.3 | 2400 | 15.7 | 90.1 | 35.1 |
| 14 | 0.09 | 6.9 | 55 | 0.46 | 677 | 60.4 | 7.5 | 34.6 | 1200 | 15.2 | 90.2 | 28.5 |
| 15 | 0.35 | 3.8 | 53 | 0.08 | 673 | 96.1 | 1.8 | 6.9 | 4100 | 18.3 | 97.6 | 29.6 |
| 16 | 0.29 | 4.3 | 50 | 0.01 | 656 | 90.8 | 3.0 | 9.9 | 4500 | 16.1 | 96.7 | 28.1 |
| 17 | 0.40 | 2.3 | 47 | 0.01 | 596 | 97.1 | 0.9 | 5.1 | 5600 | 15.8 | 98.6 | 19.9 |

As can be understood from the results of sample Nos. 1 and 2 in Table 2, it is possible to improve an operating time by using talc and silica raw materials having a large particle size. However, in these cases, since the coarse kaolin and alumina raw materials have also large particle size, thermal expansion coefficients become larger i.e., more than 0.5× 10$^{-6}$/°C. On the other hand if grain sizes of talc, silica and so on are increased in excess as shown in sample Nos. 3 and 4 in Table 2, pores having a pore size of more than 100 μm are increased and a trapping efficiency is extraordinarily lowered. Therefore, applicable fields of these ceramic filters are limited in a real use. From the results described above, in order to control an amount of pores having a pore size of more than 100 μm to under 10%, it is understood that an average particle size of silica raw materials is preferably less than 80 μm.

Figure 3:
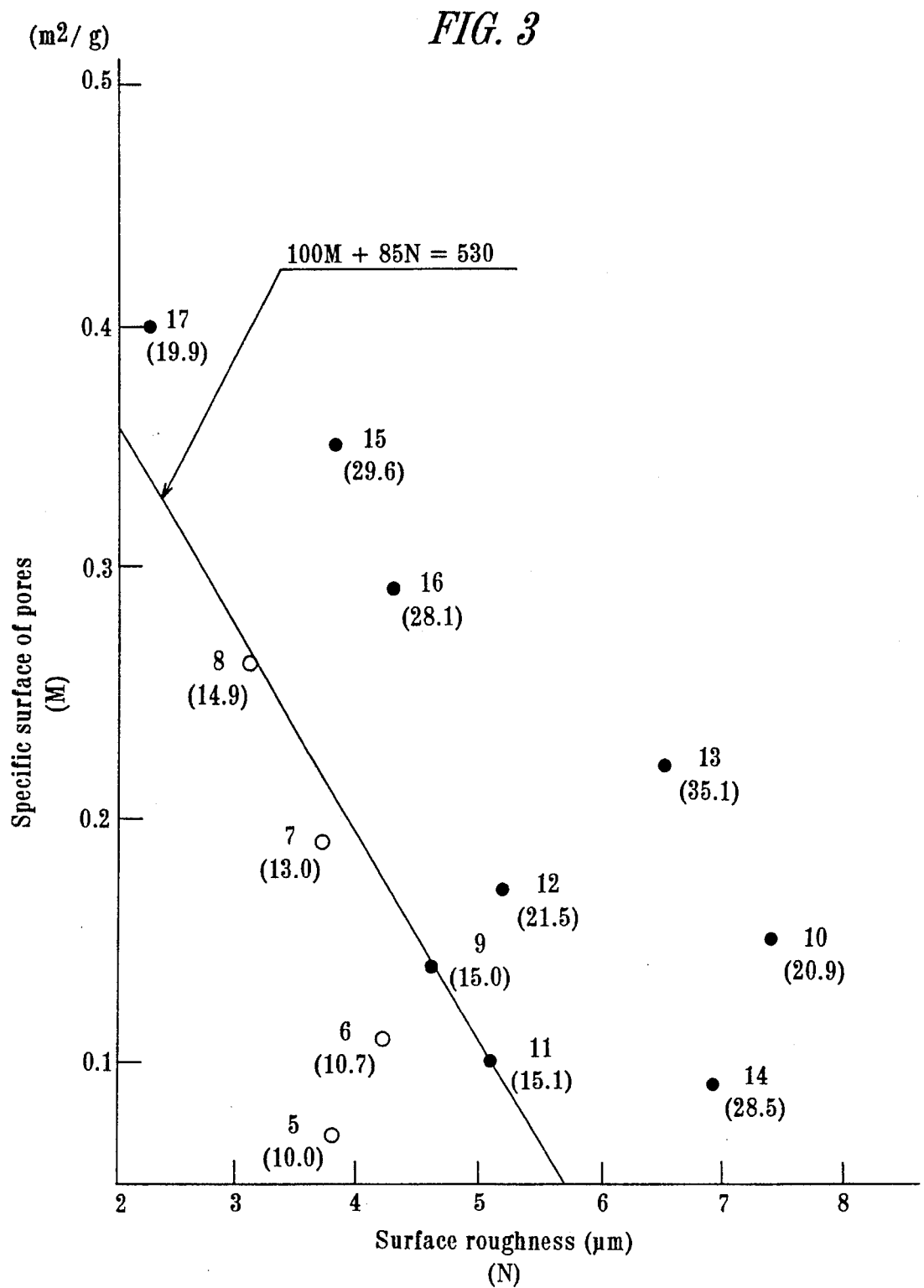
FIG. 3 is a graph depicting a relation between a specific surface of pores (M) and a surface roughness (N).

FIG. 3 shows a result wherein operating times of sample Nos. 5~17 in Table 2 are plotted with respect to a specific surface of pores M (m$^2$/g) and a surface roughness N (μm). White plots show the results of sample Nos. 5~8, and black plots illustrate the results of sample Nos. 9~17. Moreover, numerals by the plots denote sample numbers, and numerals in a parenthesis show an operating time (minutes). As can be clearly understood from FIG. 3, an operating time strongly depends upon a specific surface of pores (M) and a surface roughness (N). In general, a ceramic filter to be assembled in automobiles needs an operating time at least 1.5 as long as that of the known example of sample No. 5 in which no silica is used. To achieve this requirement, an inequality of 1000M+85N≧530 is obtained from the results of sample Nos. 8, 9 and 11 which satisfy this requirement, wherein M is a specific surface of pores and N is a surface roughness. As shown in sample Nos. 9~17 in Table 2, if a value of 1000M+85N becomes larger, a longer operating time is obtained.

Moreover, as shown in sample No. 10, if the number of open pores in a surface is not more than 1000 piece/mm², an air flowability of a collection surface is decreased, and an operating time is shortened as compared with that of sample No. 13 which has a same value of 1000M+85N. Moreover, as shown in sample No. 14, if an amount of small pores having a pore size of less than 400 μm is lowered as 60%, an operating time is shortened as compared with that of sample No. 15 which has a same value of 1000M+85N. As mentioned above, if an amount of small pores having a pore size of less than 400 μm is increased and also the number of open pores in a surface (or an area fraction) becomes larger, an operating time is preferably prolonged.

In order to produce a ceramic filter satisfying an inequality of 1000M+85N≧530, since a specific surface of pores (M) and a surface roughness (N) can be controlled by talc and silica raw materials, properties of talc and silica raw materials are controlled. Especially, if use is made of talc raw materials having a grain size less than 2 times as large as that of silica raw materials, it is easy to obtain the ceramic filter which satisfies such an inequality.

As shown in sample No. 17 in Table 2, if grain sizes of talc and silica are small, the number of small pores is increased and pore continuity is improved. Therefore, a specific surface (M) becomes larger and an operating time can be prolonged. As shown in sample No. 14 in Table 2, if grain sizes of talc and silica are relatively large, an operating time can be prolonged, since large open pores are formed in a surface due to silica raw materials having a large grain size and thus a surface roughness (N) is improved.

As shown in sample No. 13 in Table 2, if a grain size of talc is small and a grain size of silica is large, it is possible to improve largely a specific surface of pores (M), since fine talc is distributed uniformly in a rib of the filter and pore continuity is improved. At the same time, it is possible to improve largely a surface roughness (N), since large open pores are formed in a surface due to coarse silica raw materials. Therefore, an operating time can be prolonged.

Further, sample Nos. 6, 7 and 8 in Table 2 show the case that a grain size of talc is more than 2 times as large as that of silica, especially that a grain size of talc is larger and larger and a grain size of silica is smaller and smaller. In these cases, since shapes of talc particles are planner and coarse, talc particles are gathered in a center portion of a rib due to an extruding operation, and thus closed large pores are increased in the center portion Therefore, pore continuity decreases and a specific surface of pores (M) decreases. At the same time, since fine silica particles do not generate large open pores in a surface, a surface roughness (N) is decreased. Therefore, an operating time is not prolonged. Especially, as for talc, it is possible to decrease inner closed pores as compared with pores in a surface by controlling a grain size of talc to less than 40 μm.

As mentioned above, it is possible to obtain the ceramic filter which satisfies an inequality of 1000M+85N≧530, wherein M is a specific surface of pores and N is a surface roughness, by using talc having a grain size more than 2 times as large as that of silica. Moreover, the ceramic filter mentioned above shows an excellent operating time such as more than 1.5 times as long as that of the conventional ceramic filter.

Moreover, it is important to lower a thermal expansion coefficient of the filter for improving a heat resistivity. If a thermal expansion coefficient of the filter is large in excess, a crack generation occurs due to a temperature difference in the filter generated by soot firing in the case of filter regeneration, and thus a life of the filter is shortened.

If the present invention, since use is made of fine kaolin and alumina raw materials, a reactability in the case of cordierite generation can be improved, and thus it is possible to lower a thermal expansion coefficient of the filter. That is to say, as shown in Table 1, a thermal expansion coefficient can be lowered to less than $0.5 \times 10^{-6}$/°C. as shown in Table 2 by using kaolin raw materials having a particle size of less than 5 μm and alumina raw materials having a particle size of less than 2 μm. Moreover, it is possible to improve pore continuity in the filter by using fine kaolina and alumina raw materials, since fine kaolin and alumina serve to generate small pores in a rib of the filter. Further, a trapping efficiency (operating time) can be improved by controlling grain sizes of talc and silica raw materials. Furthermore, to obtain a porosity (for example 45%), it is preferred to use a suitable amount of poring agents.

What is claimed is:

1. A porous ceramic honeycomb filter used for separating a solid phase and a gas phase from a mixture phase including the solid phase and gas phase, wherein (i) a porosity of said filter is about 45% to 60%; (ii) a volume of pores having a pore size of more than 100 μm is less than 10% of the total volume of pores in said ceramic filter; (iii) a thermal expansion coefficient of said ceramic filter is less than $0.5 \times 10^{-6}$/°C. within a temperature range of 40°~800° C. in a direction parallel to a flow passage of said ceramic filter; and (iv) an inequality of 1000M+85N≧530 is satisfied, wherein M, measured in units of $m^2/g$ is a specific surface area of total pores continued from a surface to an inner portion of said filter and N, measured in units of μm, is a surface roughness of a surface of said filter.

2. The porous ceramic filter according to claim 1, wherein the number of open pores in a surface of said ceramic filter is more than 1000 per /mm².

3. The porous ceramic filter according to claim 1, wherein an area of open pores in a surface of said ceramic filter is 15% of the total area of said surface.

4. The porous ceramic filter according to claim 1, wherein a mean pore size of said ceramic filter is less than 40 μm.

5. The porous ceramic filter according to claim 1, wherein a volume of pores having a pore size of less than 40 μm is more than 60% of the total volume of pores of said ceramic filter.

6. The porous ceramic filter according to claim 1, wherein said ceramic filter comprises cordieritc.

* * * * *